(12) United States Patent
Ondruska et al.

(10) Patent No.: US 11,205,298 B2
(45) Date of Patent: Dec. 21, 2021

(54) METHOD AND SYSTEM FOR CREATING A VIRTUAL 3D MODEL

(71) Applicant: BLUE VISION LABS UK LIMITED, London (GB)

(72) Inventors: Peter Ondruska, London (GB); Lukas Platinsky, London (GB)

(73) Assignee: BLUE VISION LABS UK LIMITED, London (GB)

(*) Notice: Subject to any disclaimer, the term of this patent is extended or adjusted under 35 U.S.C. 154(b) by 135 days.

(21) Appl. No.: 16/591,807

(22) Filed: Oct. 3, 2019

(65) Prior Publication Data

US 2020/0126289 A1 Apr. 23, 2020

Related U.S. Application Data

(63) Continuation of application No. 15/274,898, filed on Sep. 23, 2016, now Pat. No. 10,460,511.

(51) Int. Cl.
*G06T 15/20* (2011.01)
*G06T 7/73* (2017.01)
(Continued)

(52) U.S. Cl.
CPC .......... *G06T 15/20* (2013.01); *G06T 7/55* (2017.01); *G06T 7/579* (2017.01); *G06T 7/73* (2017.01);
(Continued)

(58) Field of Classification Search
CPC .......... G06T 15/20; G06T 7/579; G06T 7/55; G06T 7/73; G06T 15/08;
(Continued)

(56) References Cited

U.S. PATENT DOCUMENTS 6,445,809 B1 * 9/2002 Sasaki ............... B60R 1/00
340/436
6,990,228 B1 1/2006 Wiles et al.
(Continued)

OTHER PUBLICATIONS

International Search Report from PCT/GB2017/052789 dated Nov. 17, 2017.
(Continued)

Primary Examiner — Wesley J Tucker
(74) Attorney, Agent, or Firm — Sheppard Mullin Richter & Hampton LLP

(57) ABSTRACT

There is provided a method for creating a voxel occupancy model. The voxel occupancy model is representative of a region of space which can be described using a three-dimensional voxel array. The region of space contains at least part of an object. The method comprises receiving first image data, the first image data being representative of a first view of the at least part of an object and comprising first image location data, and receiving second image data, the second image data being representative of a second view of the at least part of an object and comprising second image location data. The method also comprises determining a first descriptor, the first descriptor describing a property of a projection of a first voxel of the voxel array in the first image data, and determining a second descriptor, the second descriptor describing a property of a projection of the first voxel in the second image data. The method also comprises assigning an occupancy value to the first voxel based on the first and second descriptors, the occupancy value being representative of whether the first voxel is occupied by the at least part of an object.

20 Claims, 6 Drawing Sheets

(51) Int. Cl.
  *G06T 7/579* (2017.01)
  *G06T 7/55* (2017.01)
  *G06T 15/08* (2011.01)

(52) U.S. Cl.
  CPC .... *G06T 15/08* (2013.01); *G06T 2207/10004* (2013.01); *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/30244* (2013.01)

(58) Field of Classification Search
  CPC . G06T 2207/10016; G06T 2207/10024; G06T 2207/10004; G06T 2207/10028; G06T 2207/20081; G06T 2207/20084; G06T 2207/30244
  See application file for complete search history.

(56) References Cited

U.S. PATENT DOCUMENTS

| | | | | |
|---|---|---|---|---|
| 8,854,458 | B2* | 10/2014 | Fukamachi | G06T 7/215 348/142 |
| 9,053,554 | B2* | 6/2015 | Uchida | G06T 7/20 |
| 2007/0250465 | A1 | 10/2007 | Moden | |
| 2010/0183192 | A1* | 7/2010 | Fritsch | G06T 7/254 382/103 |
| 2010/0194741 | A1* | 8/2010 | Finocchio | G06T 7/269 345/419 |
| 2012/0127270 | A1* | 5/2012 | Zhang | G06T 7/579 348/43 |
| 2013/0156297 | A1* | 6/2013 | Shotton | G06K 9/6255 382/159 |
| 2015/0178988 | A1 | 6/2015 | Mora et al. | |
| 2016/0189419 | A1* | 6/2016 | Fakih | G06T 15/08 345/419 |
| 2017/0024900 | A1* | 1/2017 | Geiger | G06T 7/579 |
| 2018/0059679 | A1 | 3/2018 | Taimour et al. | |
| 2021/0103299 | A1* | 4/2021 | Zhou | G06T 7/269 |
| 2021/0118153 | A1* | 4/2021 | Schmid | G06T 7/269 |

OTHER PUBLICATIONS

Written Opinion from PCT/GB2017/052789 dated Nov. 17, 2017.
A. Karpathy et al., "Deep visual-semantic alignments for generating image descriptions" In Proceedings of the IEEE Conference on Computer Vision and Pattern Recognition, pp. 3128-3137, 2015.
A. Karpathy, et al., "Large-scale video classification with convolutional neural networks", In Proceedings of the IEEE conference on Computer Vision and Pattern Recognition, pp. 1725-1732, 2014.
A. Kumar, et al., "Ask me anything: Dynamic memory networks for natural language processing", arXiv preprint arXiv:1506.07285, Mar. 5, 2015, 10 pages.
Choy, et al., "3D-R2N2: A Unified Approach for Single and Multi-view 3D Object Reconstruction", Apr. 2, 2016, 17 pages.
Chung,et al., "Empirical evaluation of gated recurrent neural networks on sequence modeling", arXiv preprint arXiv:1412.3555, Dec. 11, 2014, 9 pages.
Collobert, et al., "A unified architecture for natural language processing: Deep neural networks with multitask learning", In Proceedings of the 25th international conference on machine learning, pp. 160-167, ACM, 2008.
D. J. Rezende, et al., "Unsupervised learning of 3d structure from images", arXiv preprint arXiv:1607.00662, Jul. 3, 2016, 17 pages.
Dyer, Charles R. "Volumetric scene reconstruction from multiple views." Foundations of image understanding. Springer, Boston, MA, 2001. 469-489. (Year: 2001).
E. Thibodeau-Laufer, et al., "Deep generative stochastic networks trainable by backprop", arXiv: 1306.1091 v5, May 24, 2014, 16 pages.
Eisert, Peter, Eckehard Steinbach, and Bernd Girod. "Multi-hypothesis, volumetric reconstruction of 3-D objects from multiple calibrated camera views." Acoustics, Speech, and Signal Processing, 1999. Proceedings., 1999 IEEE International Conference, vol. 6. IEEE, 1999. (Year: 1999).
F. Yu et al., "Multi-scale context aggregation by dilated convolutions" arXiv preprint arXiv:1511.07122, Apr. 30, 2015, 13 pages.
Girdhar, Rohit, et al. "Learning a predictable and generative vector representation for objects." European Conference on Computer Vision. Springer, Cham, 2016. (Year: 2016).
Handa, et al., "gvnn: Neural Network Library for Geometric Computer Vision," arXiv preprint arXiv:1607.07405, Aug. 12, 2016, 16 pages.
He, et al., "Deep residual learning for image recognition", arXiv preprint arXiv:1512.03385, Dec. 10, 2015, 12 pages.
J. Kannala, et al., "A generic camera model and calibration method for conventional, wide-angle, and fish-eye lenses," IEEE transactions on pattern analysis and machine intelliqence, 28(8):1335-1340, 2006.
J. Zbontar, et al., "Stereo matching by training a convolutional neural network to compare image patches", Journal of Machine Learning Research, 17:1-32, 2016, 32 pages.
M. D. Zeiler, et al., "Deconvolutional networks," In Computer Vision and Pattern Recognition (CVPR), 2010 IEEE Conference, pp. 2528-2535, IFFF, 2010.
P. OndrSka, et al., "MobileFusion: Real-time volumetric surface reconstruction and dense tracking on mobile phones" IEEE transactions on visualization and computer graphics, 21(11):1251-1258, 2015.
R. A. Newcombe, et al., "KinectFusion: Real-Time Dense Surface Mapping and Tracking", In Mixed and augmented reality (ISMAR), 2011 10th IEEE international symposium, pp. 127-136. IEEE, 2011.
R. A. Newcombe, et al., "DTAM: Dense tracking and mapping in real-time", In 2011 international conference on computer vision, pp. 2320-2327. IEEE, 2011.
R. Hartely, "Multiple view geometry in computer vision", Cambridge university press, Second Edition, 2003, 672 pages.
R. Hecht-Nielsen, "Theory of the Backpropagation Neural Network", In Neural Networks, 1989, IJCNN, International Joint Conference, pp. 593-605, IEEE, 1989.
R. Socher, et al., "Grounded compositional semantics for finding and describing images with sentences", Transactions of the Association for Computational Linguistics, 2:207-218, 2014.
S. Hochreiter, et al., "Long Short-Term Memory", Neural computation, Massachusetts Instituted of Technoloqy, 9(8):1735-1780, 1997.
S. Zagoruyko, et al., "Learning to compare image patches via convolutional neural networks", In Proceedings of the IEEE Conference on Computer Vision and Pattern Recognition, pp. 4353-4361, 2015.
S. Zheng, et al., "Conditional random fields as recurrent neural networks", In Proceedings of the IEEE International Conference on Computer Vision, pp. 1529-1537, 2015.
Y. LeCun, et al., "Convolutional networks for images, speech, and time series", The handbook of brain theory and neural networks, 3361(10):1995, 199, 14 paqes.
Yin, Jianfeng, and Jeremy R. Cooperstock. "Color correction methods with applications to digital projection environments." (2004). (Year: 2004).

\* cited by examiner

METHOD AND SYSTEM FOR CREATING A VIRTUAL 3D MODEL

CROSS-REFERENCE TO RELATED APPLICATIONS

This application is a continuation of U.S. patent application Ser. No. 15/274,898, filed on Sep. 23, 2016 and entitled "METHOD AND SYSTEM FOR CREATING A VIRTUAL 3D MODEL", which is incorporated herein by reference in its entirety.

This disclosure relates to the field of computer vision, and in particular to a method and system for creating a virtual 3D model of an object.

BACKGROUND

Understanding the 3D structure of the world from a series of 2D image observations, and in particular producing a 3D reconstruction from a sequence of 2D images, is an important undertaking in the field of computer vision. Creating a virtual 3D model from image data has applications in many fields such as but not limited to robotics, self-driving cars and augmented-reality. Augmented reality involves projecting a virtual object onto the physical (real) world around us. Virtual objects may be created from real objects, such that they can be projected into these spaces. Secondarily, for robotics, self-driving cars, and augmented-reality alike, it may be of importance to be able to know the position of a device (phone, drone, car) in the world, and 3D models of the surroundings may be helpful.

Existing approaches tend to fall into one of two categories: geometric methods and deep learning methods.

As discussed in the book by R. Hartley and A. Zisserman "Multiple view geometry in computer vision" Cambridge university press, 2003, existing geometric approaches are based on the principles of multi-view geometry. Given two or more images $I_1, I_2, \ldots I_N$ taken at positions $T_1, T_2, \ldots, T_N \in SE_3$ and pixel correspondences between those images, it is possible to triangulate the 3D positions of the image pixels. To determine these correspondences, it is possible to extract an image patch around a pixel and perform an exhaustive search along an epipolar line, finding the position of a similar patch in a different image. If this is done for each pixel, it is possible to produce a 2.5D depth image which contains depth information about each pixel, e.g. the distance of each pixel from the camera in a respective image.

To compute the complete 3D model, one must concatenate several 2.5D depth images together, or alternatively fuse them into a single volumetric model. In the case of the latter approach, the 3D space is split into a grid of voxels, and the content of each voxel is calculated via the following rules: if at some point a voxel is observed at a distance closer than the corresponding pixel depth, it is considered a part of a free space. Otherwise, it can be considered to be 'occupied'.

However, this type of system is subject to erroneous pixel correspondences, which results in incorrect depth computations. Also, fusing the depth images into a single volumetric model in the manner described above is time-consuming, and consumes computer resources.

A second known approach is to use so-called 'deep learning', for instance as discussed in the article by C. B. Choy, D. Xu, J. Gwak, K. Chen, and S. Savarese. "3D-R2N2: A unified approach for single and multi-view 3D object reconstruction" arXiv preprint arXiv:1604.00449, 2016 and the article by D. J. Rezende, S. Eslami, S. Mohamed, P. Battaglia, M. Jaderberg, and N. Heess "Unsupervised learning of 3S structure from images".arXiv preprint arXiv:1607.00662, 2016. In this approach, deep generative models are conditioned on the input images directly. The underlying principle in this approach is that, first, the individual 2D input images are compressed into a 1D feature vector, which summarises the content of the image. These 1D feature vectors are later passed as input to a long short-term memory (LSTM) network, the output of which is used to generate a model.

This approach is suitable for 'imagining' a missing part of a known object, but tends to lead to generalisation problems when modelling new unknown, observed objects.

Therefore, an approach which is less resource-intensive, less time-consuming, and which can provide a better model of unknown observed objects is required. The present disclosure describes such an approach.

SUMMARY

A method and system are set out in the independent claims. Optional features are set out in the dependent claims.

According to an aspect, there is provided a method for creating a voxel occupancy model. The voxel occupancy model is representative of a region of space which can be described using a three-dimensional voxel array. The region of space contains at least part of an object. The method comprises receiving first image data, the first image data being representative of a first view of the at least part of an object and comprising first image location data, and receiving second image data, the second image data being representative of a second view of the at least part of an object and comprising second image location data. The method also comprises determining a first descriptor, the first descriptor describing a property of a projection of a first voxel of the voxel array in the first image data, and determining a second descriptor, the second descriptor describing a property of a projection of the first voxel in the second image data. The method also comprises assigning an occupancy value to the first voxel based on the first and second descriptors, the occupancy value being representative of whether the first voxel is occupied by the at least part of an object.

In some embodiments, the method further comprises receiving a set of image data, each respective member of the set of image data being representative of a view of the at least part of an object and comprising image location data. The method may also comprise determining a descriptor for each member of the set of image data, each descriptor of the resulting plurality of descriptors describing a property of a projection of the first voxel of the voxel array in each corresponding member of the set of image data. The method may also comprise assigning an occupancy value to the first voxel based on the determined descriptors.

In some embodiments, the method further comprises determining a respective plurality of descriptors for each voxel of the voxel array, and assigning an occupancy value to each voxel based on the determined descriptors.

In some embodiments, the property of the first projection is the 2D location of the projection of the first voxel in the first image data, and the property of the second projection is the 2D location of the projection of the first voxel in the second image data.

In some embodiments, both the first image data and the second image data is received from a camera arranged to move with respect to the at least part of an object.

In some embodiments, the first image data is received from a first camera and the second image data is received from a second camera, the first and second cameras being positioned at respective locations with respect to the at least part of an object.

In some embodiments, the first image location data is representative of the pose of the first image, and the second image location data is representative of the pose of the second image.

In some embodiments, the method further comprises outputting a voxel occupancy model, the voxel occupancy model comprising the assigned occupancy value for each voxel which has been assigned an occupancy value.

In some embodiments, the method further comprises generating a visual representation of the at least part of an object from the voxel occupancy model.

In some embodiments, the first image data comprises first encoded image data representative of a first image taken from the first view, wherein the first encoded image data describes a property of each pixel of a plurality of pixels of the first image. In some embodiments, the second image data comprises second encoded image data representative of a second image taken from the second view, wherein the second encoded image data describes a property of each of a plurality of pixels of the second image.

In some embodiments, the property comprises a brightness value, an intensity value, a pattern, a texture, a colour value, or image features such as image corners or gradient.

In some embodiments, the descriptors are determined using a neural network.

In some embodiments, the descriptors are input into a neural network, and the occupancy value is determined based on an output of the neural network.

According to an aspect, there is provided a system comprising a processor configured to perform the method as discussed above and as disclosed herein.

According to an aspect, there is provided a computer-readable medium comprising computer-executable instructions which, when executed, perform the method as discussed above and as disclosed herein.

FIGURES

Specific embodiments are now described with reference to the drawings, in which.

DETAILED DESCRIPTION

The present invention seeks to provide an improved method and system for creating a virtual 3D model of an object. Whilst various embodiments of the invention are described below, the invention is not limited to these embodiments, and variations of these embodiments may well fall within the scope of the invention, which as such is to be limited only by the appended claims.

Figure 1:
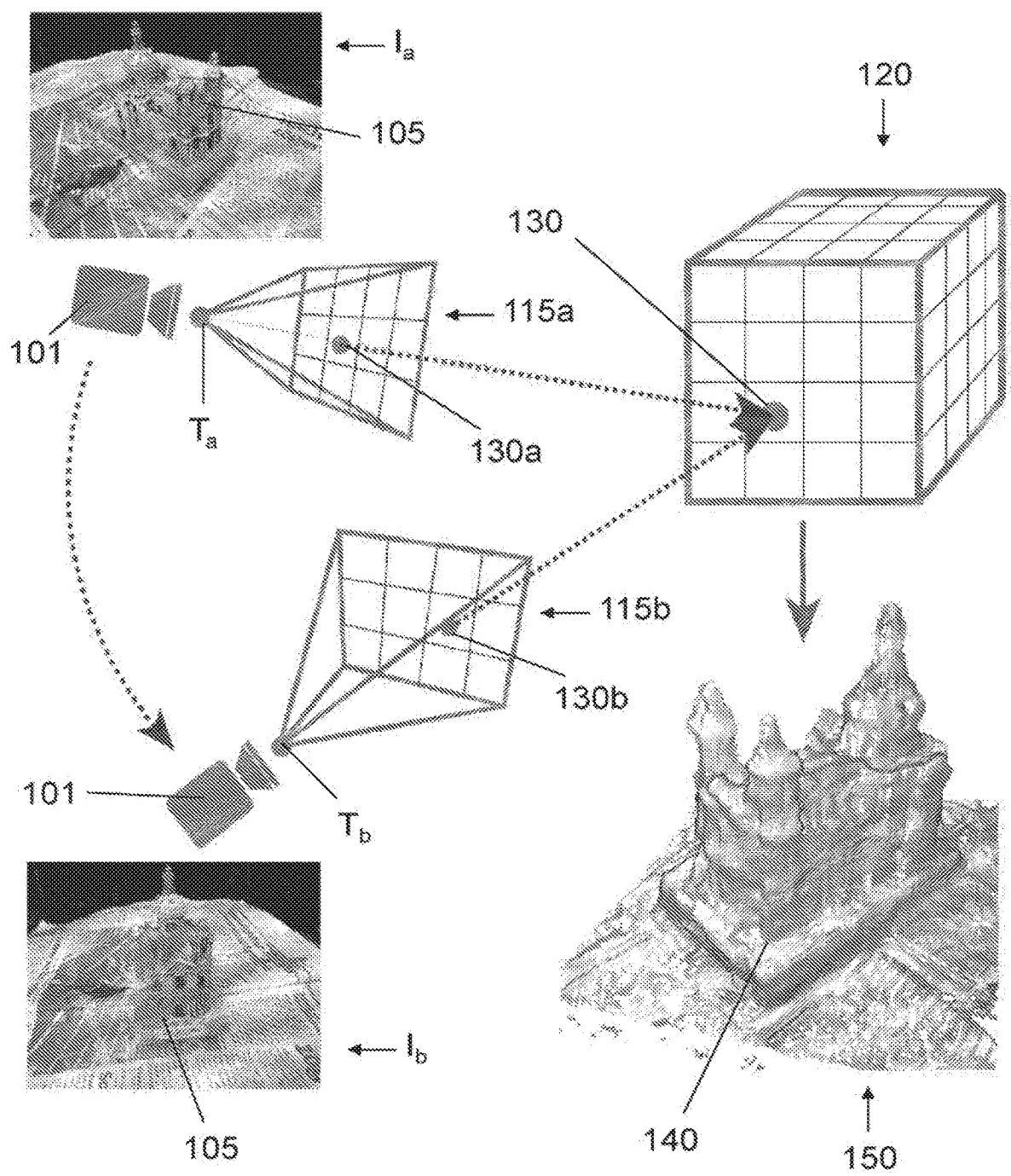
FIG. 1 depicts a schematic overview of a 3D modelling process.

In accordance with an embodiment of the invention, FIG. 1 shows a schematic diagram of a 3D modelling process. An object 105 is located in a region of space. In FIG. 1, the object 105 is, by way of an example, a model of a cathedral. The region of space can be described using a voxel array 120, with each voxel $V_j$ in the voxel array describing a small element of physical space, "j" being an index that corresponds to a particular voxel, as will be understood by the skilled person. For the purposes of the modelling process, a particular voxel $V_j$ is said to be 'occupied' if part of the object 105 is located within the voxel. A particular voxel $V_j$ can be considered part of free space, and thus not occupied, if no part of the object 105 is located within the voxel.

In overview, the process described herein involves taking a plurality of images $I_i$ of the object 105 from a plurality of locations T around the object 105. Image data $115_i$ associated with each image $I_i$ includes data representative of the image $I_i$ and also comprises data Ti associated with the pose of each image, i.e. the location and angular orientation of the camera at the position $T_i$. The image data undergoes a 'projective pooling' process, with the pooled output from individual images being merged using a neural network to allow a virtual 3D model/voxel occupancy model 150 of the region of space to be produced. The occupancy model 150 describes a 3D model 140 of the object 105.

A camera 101 is moveable around the object 105, and thus can be arranged to capture images from various locations $T_i$ around the object 105. Two different camera locations $T_a$ and $T_b$ are shown in FIG. 1. FIG. 1 shows an image $I_a$ of the object 105 being taken from location $T_a$. Accordingly, first image data 115a can be produced. First image data 115a also includes information about the image pose, e.g. the location and angle of the viewpoint of the camera at location $T_a$. As will be appreciated, the first image $I_a$ is a projection of the object 105 in the plane of the camera 101 at the first location $T_a$.

Similarly, an image $I_b$ of the object 105 is taken from location $T_b$. Accordingly, second image data 115b can be produced. Second image data 115b includes information about the image pose at camera location $T_b$. As will be appreciated, the second image $I_b$ is a projection of the object 105 in the plane of the camera 101 at the second location $T_b$.

A plurality of such images is taken of the object 105 from various viewpoints and locations $T_i$ around the object 105. In a preferred embodiment, the camera 101 moves in a circular motion around the object 105, thus capturing 'N' images from all sides of the object 105. This results in a sequence of consecutive images $I_1, I_2, \ldots I_N$ taken at positions $T_1, T_2 \ldots T_N$. Images $I_i$ can be encoded, for example each image $I_i$ can be converted into a spatially-indexable descriptor $D_i$, as will be described in more detail below.

It is possible to use the plurality of images, and in particular the image data $115_i$ associated with each image $I_i$, which includes information regarding the pose of each image, to determine whether a particular voxel 130 of the voxel array 120 is occupied by the observed object 105.

Voxel locations can be labelled $V_j$. To determine the occupancy $u_i^j$ of a voxel $V_j$ located at 3D position $q_j$, its sub-pixel location in each image $I_i$ is calculated:

$$u_i^j = \pi(T_i \cdot q_j) \tag{1}$$

where $T_i$ is image location data i.e. image pose data.

In more detail, a particular voxel's 3D projection $w=[w_x, w_y, w_z]$ into the i-th image $I_i$ is found by:

$$w = T_i \cdot q_j \tag{2}$$

The transformed 3D point of the region of space is projected into the image, and the corresponding sub-pixel location $u_i^j=[u_x, u_y]$ can be found by the projection $\pi$:

$$u_x = f_x \cdot w_x / w_z + c_x \quad (3)$$

$$u_y = f_y \cdot w_y / w_z + c_z \quad (4)$$

for intrinsic camera calibration parameters $f_x$, $f_y$, $c_x$, $c_y$, where $f_x$ and $f_y$ are the focal point, and $c_x$ and $c_y$ are the coordinates of the principal point.

Note that this is one example of possible choice of camera calibration. There exist many models, for example for fisheye, wide-angle, and macro lenses, or for different sensor types. Then choice of $f_x$, $f_y$, $c_x$, $c_y$ to describe the camera calibration one choice. Other models can be substituted here.

A local image patch $U_i^j = D_i(u_i^j)$ around this projected position can then be considered, a local image patch being a region of the image around the position $u_i^j$. The local image patch may take any size or shape of a region around the position.

As is discussed below, it is possible to determine voxel occupancy by analysing a stream of images at the positions of the projected voxel locations.

Figure 2:
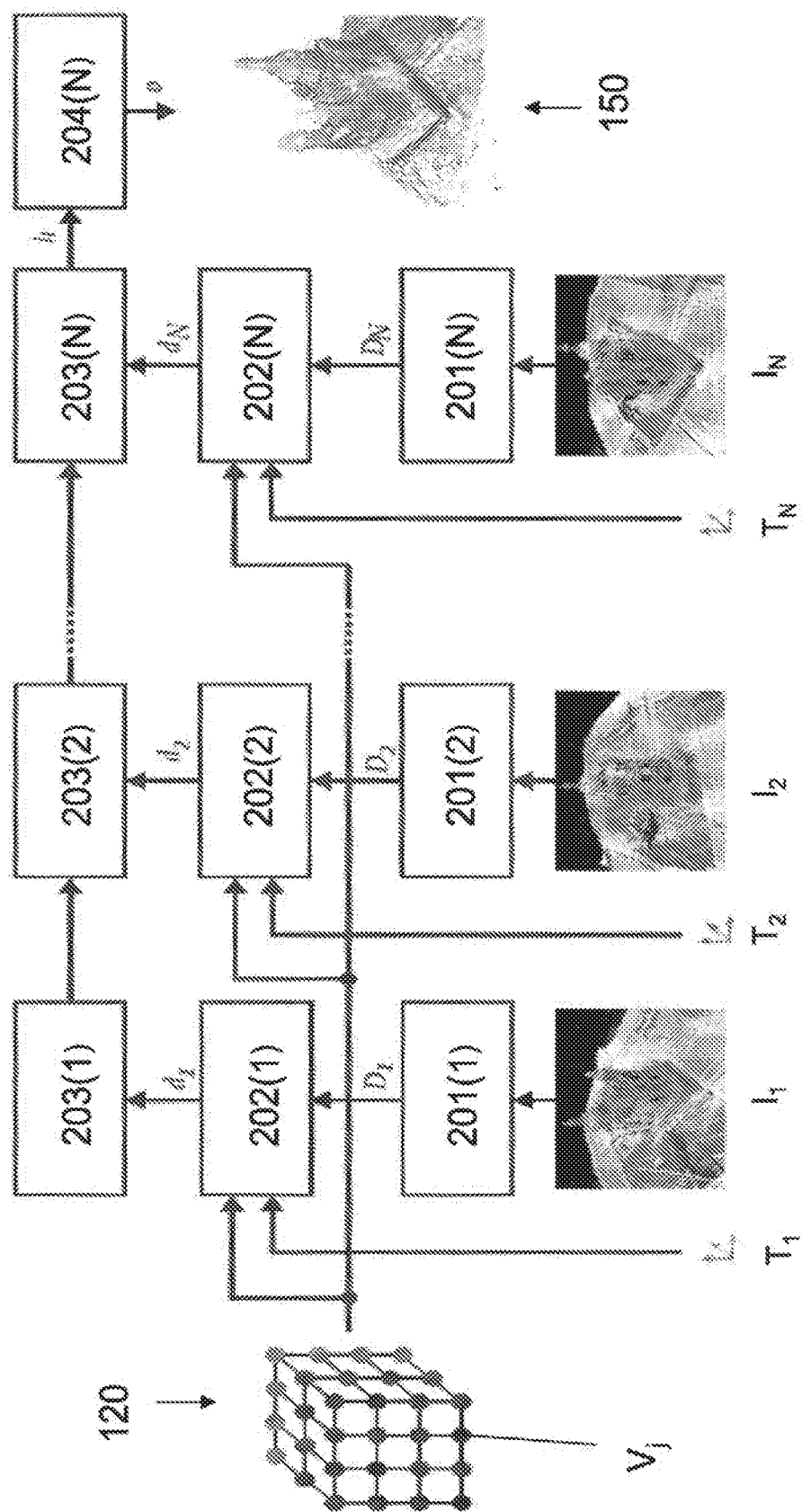
FIG. 2 depicts a schematic diagram of a 3D modelling apparatus.

FIG. 2 depicts a schematic diagram of a 3D modelling apparatus suitable to implement a 3D modelling process in accordance with an embodiment of the invention. The present system can directly classify voxel occupancy from a sequence of images with associated image location data. A neural network architecture may be used to put this idea into practice in a single coherent network. The network is capable of classifying the occupancy of a volumetric grid of, for example, size M×M×M voxels. The process may comprise four parts, as will be described below.

In overview, the process has the following inputs: voxel positions $q_j$, image location data $T_i$ i.e. image pose data, and the corresponding images $I_i$, and has the output of a virtual 3D model/voxel occupancy model 150.

The N images $I_1, \ldots, I_N$ form a set of images. The processing of image $I_1$ will be primarily considered, and it will be appreciated that each image $I_i$ undergoes a substantially similar process. Image $I_1$ is encoded by processing device 201(1). The output of the encoding step carried out by processing device 201(1) is encoded image data. The encoded image data describes a property of each pixel of image $I_1$. The property may be, for example, a brightness value, a colour value, an intensity value, a pattern, a texture, or image features such as image corners or gradient, although any local property of the pixels may be used in the encoding step as would be appreciated by the skilled person.

Each input image $I_i$ is converted into a spatially-indexable encoded image data descriptor:

$$D_i = enc(I_i), \quad (5)$$

such that a particular section of $D_i$ corresponds to a region of image $I_i$. This process converts the input image $I_i \in \mathbb{R}^{W \times H \times 3}$ into a spatially-indexable descriptor $D_i \in \mathbb{R}^{W \times H \times K}$ which describes the local neighbourhood of each pixel by a descriptor of length K. This step may be implemented by a simple multi-layer convolutional neural network without pooling to maintain the same resolution as the image $I_1$, as would be understood by the skilled person. To support the large receptive fields necessary for detecting optical flow at different resolutions, dilated convolutions can be used. A receptive field is the portion of the image that affects the value of a particular descriptor. A dilated convolution is a special form of convolution. Convolution is the operation that combines the information within the receptive field to contribute to a particular descriptor.

The second step is a 'projective pooling' step carried out by processing device 202(1). The inputs into processing device 202(1) are the encoded image data descriptor D1, the corresponding image location data/image pose data $T_1$, and the voxel locations qj. Together, the encoded image data descriptor D1 and image location data $T_1$ comprise first image data. Similarly, encoded image data D2 and image location data $T_2$ comprise second image data, etc.

At the projective pooling stage carried out by processing device 202, a spatial descriptor d is determined for each voxel-image pair:

$$d_i^j = D_i(u_i^j) \quad (6)$$

The encoded image data descriptor Di for each image is pooled for each voxel independently by first projecting the voxel Vj into each image using Equation 1. The encoded image data descriptor Di is then bilinearly interpolated at the given sub-pixel location. This can be done in parallel resulting into pooled descriptor for each voxel $d \in \mathbb{R}$ M×M× M×K.

In this way, a first descriptor $d_1^1$ can be determined. The first descriptor describes a property of the projection of the voxel V1 in image I1. This corresponds to a projection of the voxel V1 in the first image data. In a preferred embodiment, the first descriptor $d_1^1$ is representative of the projected location of the first voxel in the first image.

A second descriptor $d_2^1$ can also be determined by processing image I2 with respect to voxel V1 in a similar manner. In this way, it is possible to determine a plurality of descriptors for voxel V1 for each member of the set of image data. The resulting plurality of descriptors can be labelled $d_i, \ldots, N^1$. This plurality of descriptors $d_i^1$ describes a relationship between voxel V1 and each image Ii. In simple terms, the plurality of descriptors $d_i^1$ can be said to describe the respective regions in all images Ii in which voxel V1 is visible. A respective plurality of descriptors can be determined for each voxel Vj of the voxel array 120.

The next stage is 'volumetric fusion' stage carried out by processing device 203. This stage involves aggregating the consecutive voxel measurements to a hidden representation h via a recurrent neural network:

$$h = RNN(d_1, d_2, \ldots d_N) \quad (7)$$

The pooled output from individual images is merged using a recurrent neural network 2013. A Recurrent Neural Network such as a 3D long short-term memory (LSTM) network can be used to perform this task, with the size of hidden state $hi \in \mathbb{R}$ M×M×M×L.

Finally, processing device 204 decodes the final volumetric occupancy model, which can be represented as follows:

$$o = dec(h) \quad (8).$$

In this stage, the output of the recurrent network 202 is fed into decoder 203, implemented as a simple multi-layer 3D convolutional network reducing the final hidden state hN into network output $O \in \mathbb{R}$ M×M×M describing the probability of occupancy of each voxel. At this stage additional mechanisms such as Conditional Random Fields-as-Recurrent Neural Networks (CRF-as-RNN) can be used to obtain a higher quality result.

Figure 3:
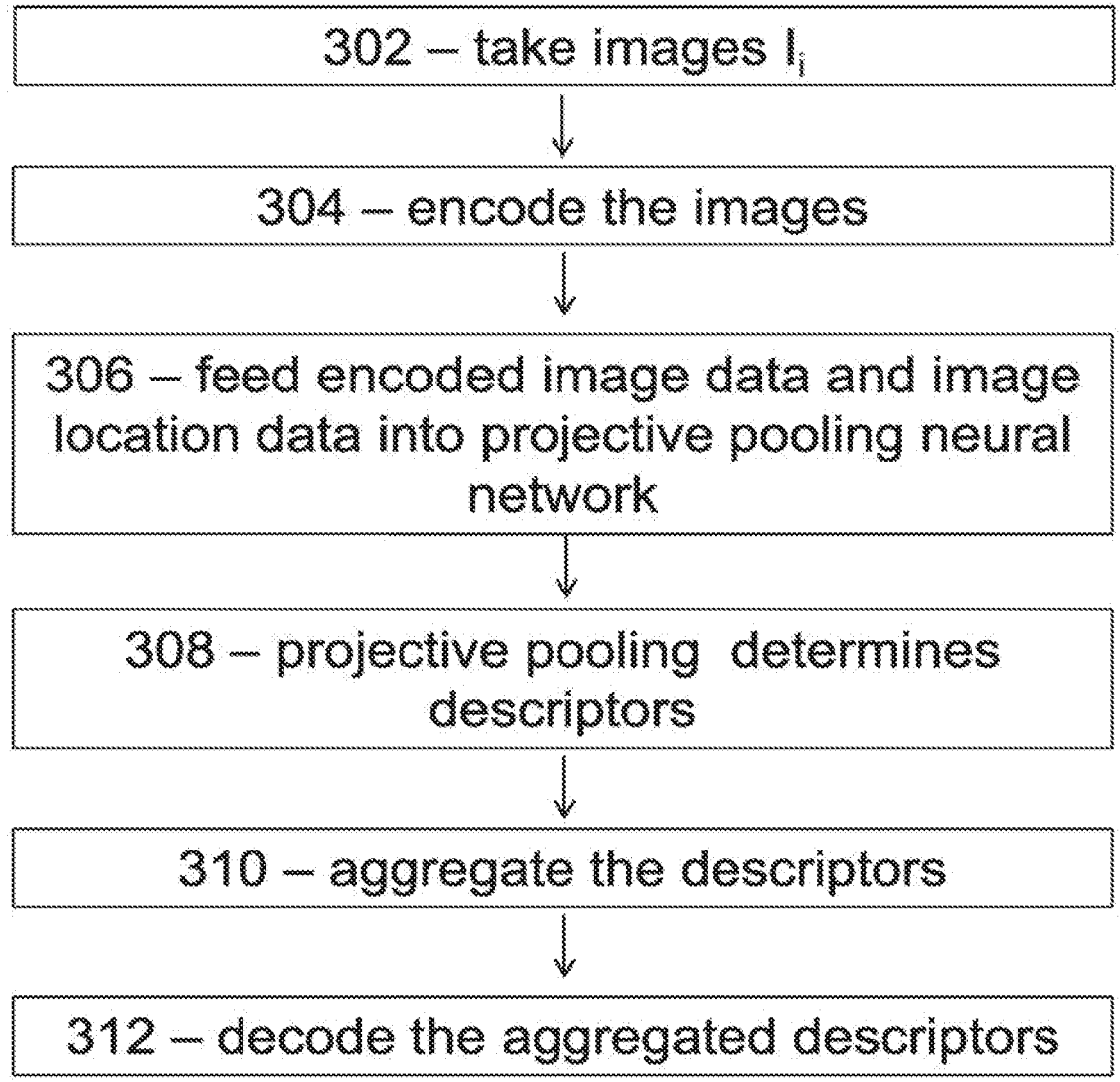
FIG. 3 depicts a flow-chart of the 3D modelling process.

FIG. 3 shows a flowchart of an embodiment of the method described herein.

At 302, a set of images I are taken of the object from a variety of different locations T around the object.

At 304, the images I are encoded to produce encoded image descriptors D. Together, descriptors D and T comprise image data.

At 306, the encoded image data D, image locations T and voxel positions q are given as inputs into the 'projective pooling' neural network. The encoding stage can be said to be outputting latent image representations.

At 308, the 'projective pooling' neural network determines a spatial descriptor $d_i^j$ for each voxel-image pair. The projective pooling stage can be said to be pooling the latent image representations.

At 310, the spatial descriptors $d_i^j$ are aggregated, as described above, using a recurrent neural network. This stage can be described as the aggregation of the pooled representations.

At 312, the aggregated descriptors are decoded into a volumetric 3D model, e.g. a voxel occupancy model. Some embodiments may comprise a further step of generating and/or outputting a visual representation of the object using the voxel occupancy model.

Figure 4:
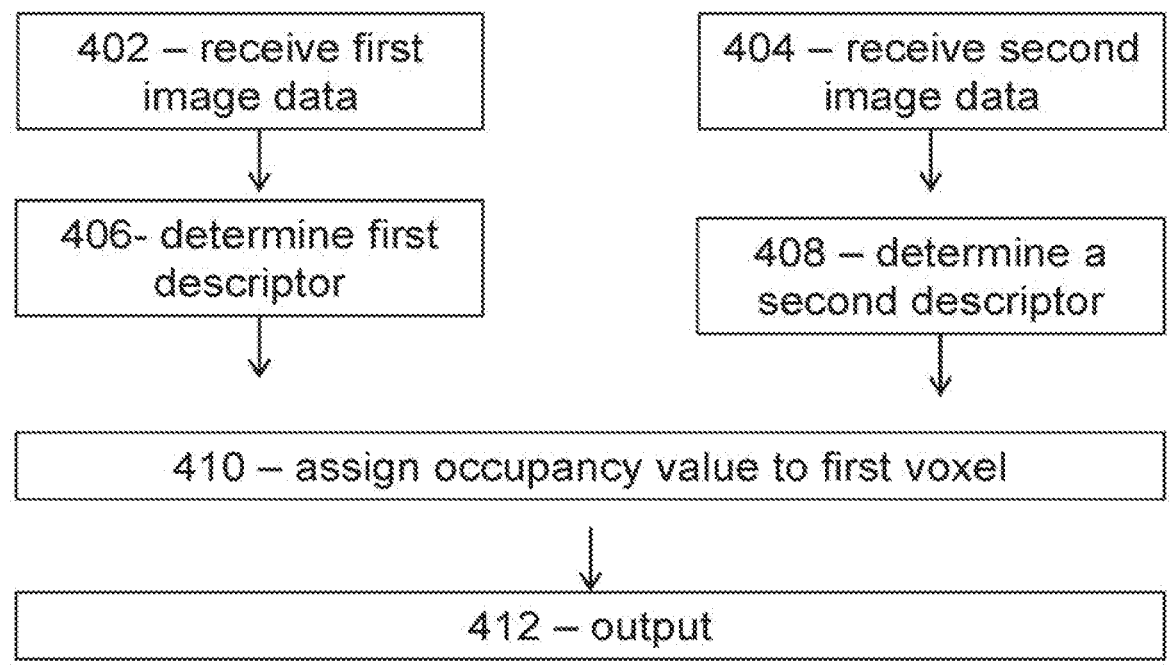
FIG. 4 depicts a flow-chart of the 3D modelling process.

FIG. 4 shows a flowchart of an embodiment of the method described herein. The method depicted in the flowchart can be performed by a processor, computer, or neural network implemented on a processing arrangement such as a processor or computer network. The method can be used to create a voxel occupancy model, the voxel occupancy model being representative of a region of space which can be described using a three-dimensional voxel array, wherein the region of space contains at least part of an object.

At 402, first image data is received. The first image data (e.g. D1+T1) is representative of a first view of the at least part of an object, and comprises first image location data.

At 404, second image data is received. The second image data (e.g. D2+T2) is representative of a second view of the at least part of an object, and comprises second image location data.

At 406, a first descriptor is determined. The first descriptor describes a property of a projection of a first voxel of the voxel array in the first image data.

At 408, a second descriptor is determined. The second descriptor describes a property of a projection of the first voxel in the second image data.

At 410, an occupancy value is assigned to the first voxel based on the first and second descriptors. The occupancy value is representative of whether the first voxel is occupied by the at least part of an object.

It will be appreciated that, in embodiments of the method described herein, this process may be repeated for image data representative of each available image of the object, in order to build up a more accurate estimate of whether or not the first voxel is occupied or not. It will also be appreciated that this process can be repeated for each voxel. This and/or these processes can be performed in parallel via one or more neural networks. A collection of predictions regarding the occupancy of any particular voxel, of a plurality of voxels, which describes a region of space can be described as a voxel occupancy model.

In optional step 412, a visual representation of the object is outputted, the visual representation being based on the occupancy value, or voxel occupancy model. Instead of generating a visual representation, the occupancy model may be passed to a robot, to allow it to navigate or interact with the object in an accurate manner.

Figure 5A:
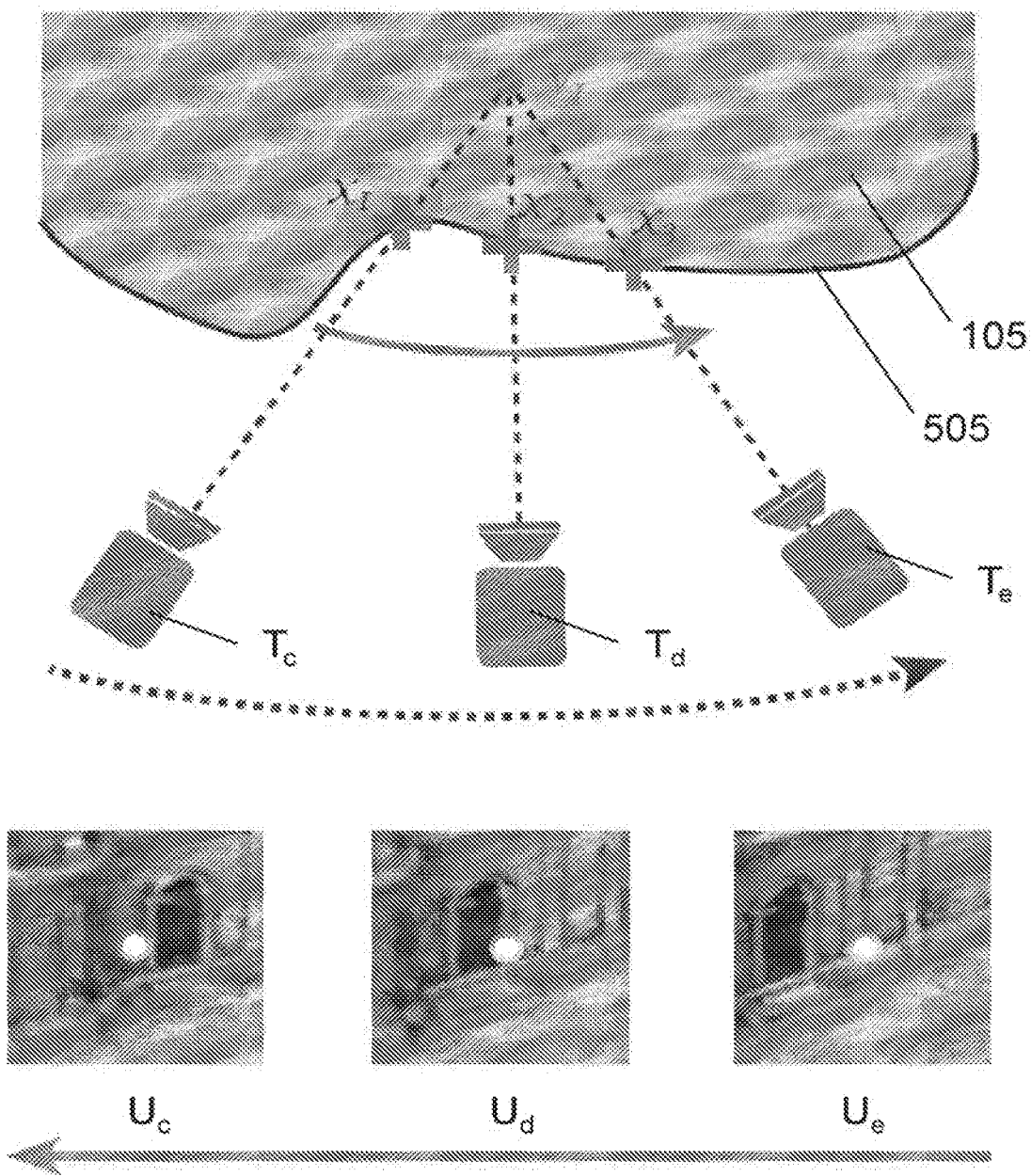
FIG. 5a depicts the observation of a voxel behind the surface of an observed object.
Figure 5B:
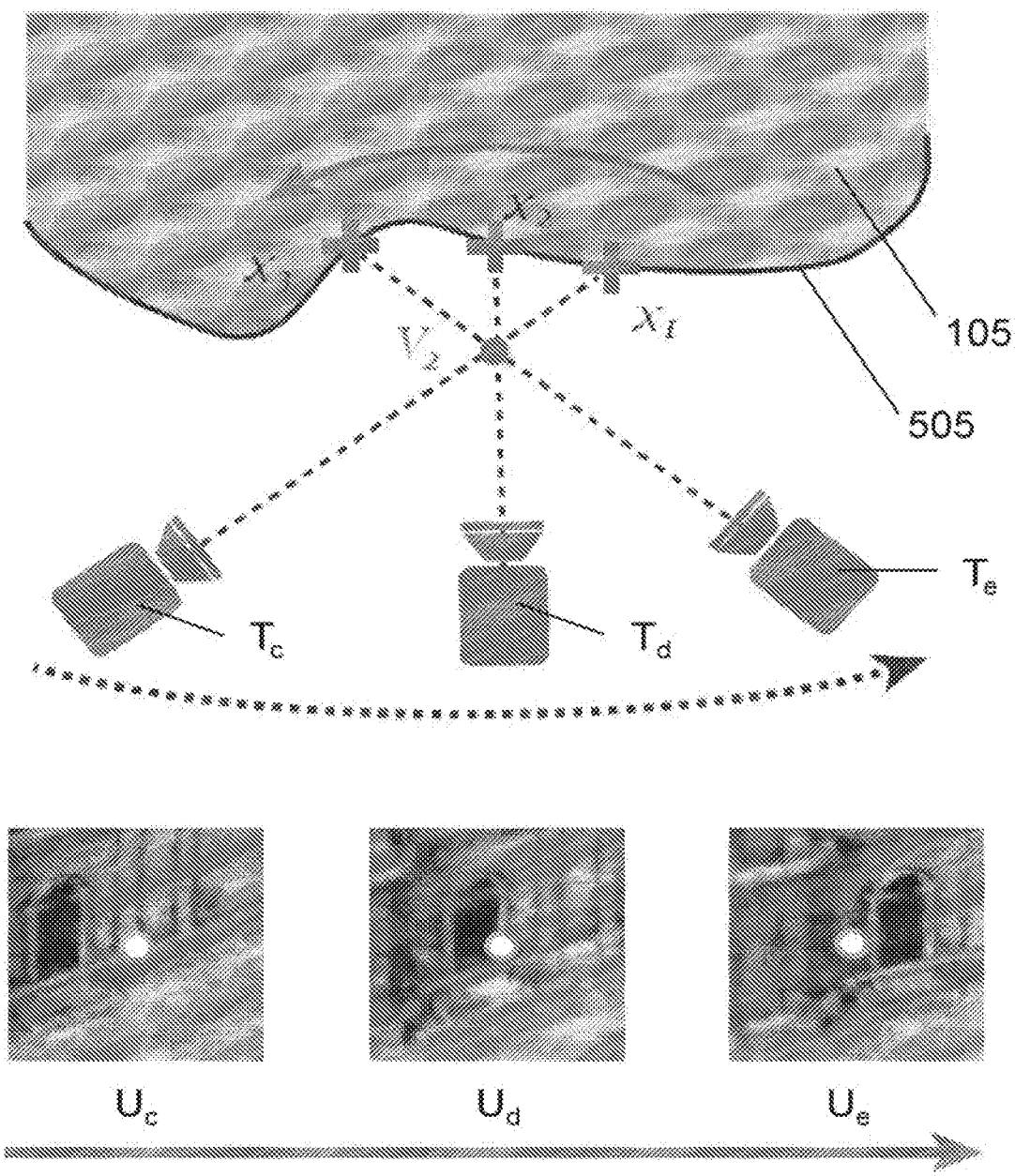
FIG. 5b depicts the observation of a voxel in front of the surface of an observed object.

FIGS. 5a and 5b depict a mechanism which the neural network may use during the projective pooling stage 202.

FIGS. 5a and 5b show part of the object 105. The part of the object 105 has a surface 505, which is imaged by camera 101 from respective locations Tc, Td, and Te. The object 105 has three points x1, x2 and x3 on its surface 505. Movement of the camera is shown by the dotted arrow. In FIG. 5a, the voxel V1 being considered is 'behind' the surface 505 of the object 105, and thus voxel V1 can be said to be occupied by the object 105. In FIG. 5b, the voxel V2 being considered is in front of the surface 505 of the object 105, and thus voxel V2 can be said to be part of free space, i.e. not occupied by the object 105.

At this stage, the direction of the local optical flow is observed. Optical flow can be described as the apparent motion of the surface 505 of the object 105 between the images Ic, Id, and Ie. This apparent motion is caused by the relative movement between the camera 101 and the surface 505 of the object 105. The local optical flow in local image patches Uc, Ud and Ue is directly related to the relative position of the voxel V1 and the observed surface 505. The direction of optical flow is shown by the solid arrow. It will be appreciated that, if the voxel is behind the surface, as in FIG. 5a, the direction of the optical flow is opposite to the camera motion. If the voxel is in front of the surface, as in FIG. 5b, the direction of the optical flow is aligned with the camera motion. The speed of the flow depends on the relative distances from the voxel to the surface and camera, and is higher when the voxel is far from the surface, and lower when it is close.

Observation and analysis of optical flow allows voxel occupancy to be determined. If a positive optical flow is detected in a sequence of images, i.e. the direction of optical flow is determined to be in broadly the same direction as the camera motion, this is evidence that a given voxel is free. Conversely, if negative optical flow is observed, then the voxel can be considered to be occupied.

A convolutional neural network can be used to analyse the similarity of image patches Uc, Ud and Ue. A combination of convolutional and recurrent neural network can be used to detect and classify the image patches, as is described in more detail below.

The method (and system) described herein is advantageous, as it is less resource-intensive, less time-consuming, and can provide a better model of unknown observed objects than previous methods and systems. Also the method and system described herein is likely to achieve higher quality models and also to generalise better that known systems. That is, it can create models of a greater variety of objects than other methods, given some amount of training data. The method and system as described herein may be run in real-time on a consumer-grade device such as a mobile phone. The method and system as described herein is also less likely to suffer from erroneous pixel-correspondences between images, which is a disadvantage of known methods. In addition, the method and system described herein does not require a depth sensor, like some other methods do.

As all the individual steps are differentiable, the entire network can be trained using standard back-propagation gradient descent. In the future this could also be done in an unsupervised manner if a differential renderer is provided. In this case, the knowledge of ground-truth voxel occupancy is not required and the training is driven by the error in the accuracy of the ray-casted model compared to the training 2D images.

It will be understood that the above description of specific embodiments is by way of example only and is not intended to limit the scope of the present disclosure. Many modifications of the described embodiments, some of which are now described, are envisaged and intended to be within the scope of the present disclosure.

It will be appreciated that multiple different types of camera may be used. Whilst an embodiment with a single moving camera has been described, it is equally possible to use multiple cameras positioned at different positions around the object in order to obtain the images Ii. Similarly, in the case of a fixed camera array or fixed camera ring, or stereo camera set up, the poses of the cameras can be known and always constant, as will be appreciated by the skilled person. Similarly, the camera projection model used has been that of a pin-hole camera, however omnidirectional camera models such as or fisheye can also be incorporated.

The structure of the encoding neural network 201 that computes encoded image data descriptors Di can be arbitrary such as, but not limited to, a convolutional networks or a deep residual network.

The structure of the recurrent neural network 202 can be arbitrary such as but not limited to LSTM, GRU or their 3D variants.

The number of images can be constant—in that case it is more accurate to instead call the recurrent neural network a neural network, in which case the encoder network 201 (Eq. (5)) for each image can be different.

The structure of the decoding network 203 Eq. (8)) can be arbitrary such as but not limited to deep generative network or a deconvolution network.

The training procedure can be semi-supervised if a differential volumetric renderer is used.

In addition to the pooled information, the recurrent network 202 (RNN, Eq. (7)) can be directly connected to the pre-processed input image to incorporate the global image content, and not only local pooled information.

The pooled descriptors di can also be computed in reverse order: first the position $u_i^j$ is computed, then explicit image patches $U_i^j$ at the given locations are extracted from image Ii. These are then independently passed through encoding network 201 enc (Eq. (5)). In this case explicit pooling does not happen but the resulting information is similar in its content as it describes information about the image at the location $u_i^j$.

The method and system as described herein may output the probability that each voxel is occupied. However rather than a probability, the system may output an arbitrary scale of occupied-ness or simply a binary scale of in or out (e.g. 1/0). The output of the system can include colour information of the model. This is achieved similarly—instead or in addition to voxel occupancy the network produces individual voxel colour. Such a network is trained similarly back-propagating the error in prediction.

The training of the recurrent neural network 202 can be improved using decoder module 203 after each step of recurrent neural network 202 and using its output as the additional input of the next step of RNN 202.

The approaches described herein may be performed by a system comprising a processor/computer, and may also be embodied on a computer-readable medium, which may be a non-transitory computer-readable medium. The computer-readable medium carries computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

In connection with the above disclosed method and system, the following items are herein disclosed:

A computer-implemented method for real-time 3D reconstruction using neural networks, the method comprising:
  receiving a stream of camera images and corresponding camera poses;
  encoding of input images into a latent image representation;
  projective pooling of latent image representation;
  aggregation of the pooled representation; and
  decoding the aggregated information into resulting volumetric 3D model.

The method and system as described herein may also be applied when only one image is input to the processing device 201, although the resulting voxel occupancy model is likely to be relatively crude compared with a system that uses data representing a plurality of views of the object. To achieve this, a method for creating a voxel occupancy model, the voxel occupancy model being representative of a region of space which can be described using a three-dimensional voxel array, wherein the region of space contains at least part of an object, may comprise:
  receiving first image data, the first image data being representative of a first view of the at least part of an object and comprising first image location data;
  determining a first descriptor, the first descriptor describing a property of a projection of a first voxel of the voxel array in the first image data; and
  assigning an occupancy value to the first voxel based on the first descriptor, the occupancy value being representative of whether the first voxel is occupied by the at least part of an object.

The following items are disclosed herein:

A. A method for creating a voxel occupancy model, the voxel occupancy model being representative of a region of space which can be described using a three-dimensional voxel array, wherein the region of space contains at least part of an object, the method comprising:
  receiving first image data, the first image data being representative of a first view of the at least part of an object and comprising first image location data;
  receiving second image data, the second image data being representative of a second view of the at least part of an object and comprising second image location data;
  determining a first descriptor, the first descriptor describing a property of a projection of a first voxel of the voxel array in the first image data;
  determining a second descriptor, the second descriptor describing a property of a projection of the first voxel in the second image data; and
  assigning an occupancy value to the first voxel based on the first and second descriptors, the occupancy value being representative of whether the first voxel is occupied by the at least part of an object.

B. The method of item A, further comprising:
  receiving a set of image data, each respective member of the set of image data being representative of a view of the at least part of an object and comprising image location data;
  determining a descriptor for each member of the set of image data, each descriptor of the resulting plurality of descriptors describing a property of a projection of the first voxel of the voxel array in each corresponding member of the set of image data; and assigning an occupancy value to the first voxel based on the determined descriptors.

C. The method of any preceding item, further comprising: determining a respective plurality of descriptors for each voxel of the voxel array, and assigning an occupancy value to each voxel based on the determined descriptors.

D. The method of any preceding item, wherein:
the property of the first projection is the 2D location of the projection of the first voxel in the first image data; and
the property of the second projection is the 2D location of the projection of the first voxel in the second image data.

E. The method of any preceding item, wherein both the first image data and the second image data is received from a camera arranged to move with respect to the at least part of an object.

F. The method of any of items A-D, wherein the first image data is received from a first camera and the second image data is received from a second camera, the first and second cameras being positioned at respective locations with respect to the at least part of an object.

G. The method of any preceding item, wherein the first image location data is representative of the pose of the first image, and the second image location data is representative of the pose of the second image.

H. The method of any preceding item, further comprising outputting a voxel occupancy model, the voxel occupancy model comprising the assigned occupancy value for each voxel which has been assigned an occupancy value.

I. The method of item H, further comprising generating a visual representation of the at least part of an object from the voxel occupancy model.

J. The method of any preceding item, wherein the first image data comprises first encoded image data representative of a first image taken from the first view, wherein the first encoded image data describes a property of each pixel of a plurality of pixels of the first image; and
the second image data comprises second encoded image data representative of a second image taken from the second view, wherein the second encoded image data describes a property of each of a plurality of pixels of the second image.

K. The method of item J, wherein the property comprises a brightness value, an intensity value, a pattern, a texture, a colour value, or image features such as image corners or gradient.

L. The method of any preceding item, wherein descriptors are determined using a neural network.

M. The method of any preceding item, wherein the descriptors are input into a neural network, and the occupancy value is determined based on an output of the neural network.

N. A system comprising a processor configured to perform the method of any preceding item.

O. A computer-readable medium comprising computer-executable instructions which, when executed, perform the method of any of items A-M.

The invention claimed is:

1. A computer-implemented method comprising:
identifying, by a computing system, a surface of an object depicted in a set of images;
determining, by the computing system, an optical flow based at least in part on an apparent motion of the surface of the object over the set of images; and
determining, by the computing system, an occupancy of a voxel in a region of space that includes at least a part of the object based at least in part on a direction of the optical flow and a direction of a camera motion of a camera associated with the set of images, wherein the voxel is unoccupied if the direction of the optical flow is similar to the direction of the camera motion and the voxel is occupied if the direction of the optical flow is opposite of the direction of the camera motion.

2. The computer-implemented method of claim 1, further comprising:
generating, by the computing system, a voxel occupancy model based at least in part on the occupancy of the voxel, wherein the voxel occupancy model describes the region of space;
generating, by the computing system, a three dimensional (3D) model of the region of space based at least in part on the voxel occupancy model; and
providing, by the computing system, the 3D model for navigation of a self-driving car.

3. The computer-implemented method of claim 1, further comprising:
determining, by the computing system, the camera motion of the camera associated with the set of images; and
determining, by the computing system, the apparent motion based at least in part on relative movement between the camera and the surface of the object.

4. The computer-implemented method of claim 3, wherein the determining the camera motion comprises:
determining locations and angular orientations of the camera as the camera moves around the object.

5. The computer-implemented method of claim 3, further comprising:
determining, by the computing system, whether the optical flow is positive or negative based at least in part on whether the direction of the optical flow is similar to the direction of the camera motion, wherein the optical flow is positive if the direction of the optical flow is similar to the direction of the camera motion and the optical flow is negative if the direction of the optical flow is the opposite of the direction of the camera motion.

6. The computer-implemented method of claim 5, wherein
the voxel is unoccupied if the optical flow is positive and
the voxel is occupied if the optical flow is negative.

7. The computer-implemented method of claim 6, wherein the determining the occupancy of the voxel further comprises:
determining the voxel to be in front of the surface of the object if the optical flow is positive; and
determining the voxel to be behind the surface of the object if the optical flow is negative.

8. The computer-implemented method of claim 1, further comprising:
determining, by the computing system, a distance between the voxel and the surface of the object based at least in part on a speed of the optical flow.

9. The computer-implemented method of claim 1, wherein the identifying the surface of the object comprises:
detecting image patches in the set of images;
classifying the image patches in the set of images based at least in part on similarity of the image patches; and
determining the image patches are associated with the surface of the object.

10. The computer-implemented method of claim 1, wherein the set of images are associated with different image resolutions and the determining the optical flow is further based at least in part on a dilated convolution.

11. A system comprising:
at least one processor, and
a memory storing instructions that, when executed by the at least one processor, cause the system to perform a method comprising:
identifying a surface of an object depicted in a set of images;
determining an optical flow based at least in part on an apparent motion of the surface of the object over the set of images; and
determining an occupancy of a voxel in a region of space that includes at least a part of the object based at least in part on a direction of the optical flow and a direction of a camera motion of a camera associated with the set of images, wherein the voxel is unoccupied if the direction of the optical flow is similar to the direction of the camera motion and the voxel is occupied if the direction of the optical flow is opposite of the direction of the camera motion.

12. The system of claim 11, wherein the method further comprises:
generating a voxel occupancy model based at least in part on the occupancy of the voxel, wherein the voxel occupancy model describes the region of space;
generating a three dimensional (3D) model of the region of space based at least in part on the voxel occupancy model; and
providing the 3D model for navigation of a self-driving car.

13. The system of claim 11, wherein the method further comprises:
determining the camera motion of the camera associated with the set of images; and
determining the apparent motion based at least in part on relative movement between the camera and the surface of the object.

14. The system of claim 13, wherein the method further comprises:
determining whether the optical flow is positive or negative based at least in part on whether the direction of the optical flow is similar to the direction of the camera motion, wherein the optical flow is positive if the direction of the optical flow is similar to the direction of the camera motion and the optical flow is negative if the direction of the optical flow is the opposite of the direction of the camera motion.

15. The system of claim 14, wherein
the voxel is unoccupied if the optical flow is positive and the voxel is occupied if the optical flow is negative.

16. A non-transitory computer-readable storage medium including instructions that, when executed by at least one processor of a computing system, cause the computing system to perform a method comprising:
identifying a surface of an object depicted in a set of images;
determining an optical flow based at least in part on an apparent motion of the surface of the object over the set of images; and
determining an occupancy of a voxel in a region of space that includes at least a part of the object based at least in part on a direction of the optical flow and a direction of a camera motion of a camera associated with the set of images, wherein the voxel is unoccupied if the direction of the optical flow is similar to the direction of the camera motion and the voxel is occupied if the direction of the optical flow is opposite of the direction of the camera motion.

17. The non-transitory computer-readable storage medium of claim 16, wherein the method further comprises:
generating a voxel occupancy model based at least in part on the occupancy of the voxel, wherein the voxel occupancy model describes the region of space;
generating a three dimensional (3D) model of the region of space based at least in part on the voxel occupancy model; and
providing the 3D model for navigation of a self-driving car.

18. The non-transitory computer-readable storage medium of claim 16, wherein the method further comprises:
determining the camera motion of the camera associated with the set of images; and
determining the apparent motion based at least in part on relative movement between the camera and the surface of the object.

19. The non-transitory computer-readable storage medium of claim 18, wherein the method further comprises:
determining whether the optical flow is positive or negative based at least in part on whether the direction of the optical flow is similar to the direction of the camera motion, wherein the optical flow is positive if the direction of the optical flow is similar to the direction of the camera motion and the optical flow is negative if the direction of the optical flow is the opposite of the direction of the camera motion.

20. The non-transitory computer-readable storage medium of claim 19, wherein
the voxel is unoccupied if the optical flow is positive and the voxel is occupied if the optical flow is negative.

* * * * *